US012537334B2

(12) United States Patent
Rappold

(10) Patent No.: US 12,537,334 B2
(45) Date of Patent: Jan. 27, 2026

(54) CONNECTION ARRANGEMENT, CONNECTING CABLE AND HOUSING

(71) Applicant: Hella GmbH & Co. KGaA, Lippstadt (DE)

(72) Inventor: Sven Rappold, Geseke (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 312 days.

(21) Appl. No.: 18/333,104

(22) Filed: Jun. 12, 2023

(65) Prior Publication Data

US 2023/0327361 A1 Oct. 12, 2023

Related U.S. Application Data

(63) Continuation of application No. PCT/EP2021/084742, filed on Dec. 8, 2021.

(30) Foreign Application Priority Data

Dec. 16, 2020 (DE) ..................... 10 2020 133 774.4

(51) Int. Cl.

| | |
|---|---|
| ***H01R 13/50*** | (2006.01) |
| ***H01R 13/04*** | (2006.01) |
| ***H01R 13/10*** | (2006.01) |
| ***H01R 13/52*** | (2006.01) |

(52) U.S. Cl.

CPC ............. *H01R 13/50* (2013.01); *H01R 13/04* (2013.01); *H01R 13/10* (2013.01); *H01R 13/5213* (2013.01); *H01R 13/5219* (2013.01)

(58) Field of Classification Search

None

See application file for complete search history.

(56) References Cited

U.S. PATENT DOCUMENTS

| | | | | |
|---|---|---|---|---|
| 5,217,387 | A | 6/1993 | Hull et al. | |
| 5,437,564 | A * | 8/1995 | Lignelet | H01R 13/514 439/701 |
| 6,416,351 | B1 * | 7/2002 | Ho | F21V 27/02 439/465 |
| 7,445,490 | B2 * | 11/2008 | Jacobson | H01R 13/5205 439/465 |

FOREIGN PATENT DOCUMENTS

| | | | | |
|---|---|---|---|---|
| DE | 20114842 | U1 * | 12/2001 | H01R 33/965 |
| DE | 10305381 | A1 | 8/2004 | |
| DE | 102010034975 | A1 | 2/2012 | |
| EP | 484289 | A2 | 5/1992 | |
| EP | 1585200 | A1 | 10/2005 | |
| EP | 3518349 | B1 | 3/2020 | |

* cited by examiner

*Primary Examiner* — Tho D Ta

(74) *Attorney, Agent, or Firm* — Husch Blackwell LLP

(57) ABSTRACT

A connection arrangement is provided, and includes a housing with a first housing shell and a second housing shell, as well as a connecting cable with a connector for connecting the connecting cable to a connecting component in the housing. The first housing shell includes a first mating retainer, and the second housing shell includes a second mating retainer. The connector includes a retainer for an interlocking and/or friction connection with the first mating retainer and the second mating retainer. A connecting cable and a housing are also provided.

18 Claims, 3 Drawing Sheets

CONNECTION ARRANGEMENT, CONNECTING CABLE AND HOUSING

CROSS REFERENCE

This application claims priority to PCT Application No. PCT/EP2021/084742, filed Dec. 8, 2021, which itself claims priority to German Application No. 10 2020 133774.4, filed Dec. 16, 2020, the entireties of both of which are hereby incorporated by reference.

FIELD OF THE INVENTION

The present invention relates to a connection arrangement, featuring a housing with a first housing shell and a second housing shell, and a connecting cable with a connector for connecting the connecting cable to a connecting component in the housing. The invention further relates to a connecting cable and a housing for such a connection arrangement.

BACKGROUND OF THE INVENTION

There are various systems for connecting a connecting cable to an electronic component in a housing for creating an electrical connection between the connecting cable and the connecting component know from the current state of technology. With connection arrangements of the given design, the challenge usually consists in fastening the connecting cable in a stable way on the housing and/or on the connecting component and at the same time creating a reliable electrical connection between the connecting cable and the connecting component. For example, solutions are known where a connector of the connecting cable is first connected to the electronic component and the connector and/or another part of the connecting cable is subsequently fastened to the housing or to a fastener on the housing. With known systems, fastening is implemented, for example, with a screw connection between a connector or the connecting cable and the housing.

BRIEF SUMMARY OF THE INVENTION

The purpose of the present invention is to create an improved connection arrangement for a mechanical and/or electrical connection that is as simple, space-saving, stable and/or cost-effective as possible between a connecting cable and an associated connecting component within a housing.

The described features that refer to the connection arrangement also apply in connection with the inventive connecting cable, the inventive housing, and vice versa in each case, such that any disclosed information regarding individual aspects of the invention refers to and/or can refer to either.

According to a first aspect of the present invention, a connection arrangement is made available. The connection arrangement features a housing with a first housing shell and a second housing shell, and a connecting cable with a connector for connecting the connecting cable to a connecting component in the housing. The first housing shell features a first mating retainer, the second housing shell features a second mating retainer and the connector features a retainer for an interlocking and/or friction connection to the first mating retainer and the second mating retainer.

Within the scope of the present invention, a connection arrangement was developed in which the housing shells can be used as a connecting element for interlocking and/or friction fastening of the connecting cable or the connector to and/or in the housing. This means that the housing shells together for an interlocking and/or friction connection through with the connector and thus also the connecting cable can be fastened to and/or in the housing. This means that separate and/or additional connecting components are not required. The connection arrangement can therefore be made available in a corresponding space-saving, simple and cost-effective manner. Furthermore, the fact that the housing shells themselves act as the fastener makes it possible to create an especially stable connection between the connecting cable and the housing.

The retainer being configured and designed for an interlocking and/or friction connection to the first mating retainer and the second mating retainer can be understood to mean that the retainer is configured and designed to retain the connector to and/or in the housing.

The first retainer and the second retainer can form a retaining gap in which the retainer or at least one part of the retainer can be arranged to be complementary and/or can be arranged in an assembled state of the connection arrangement to be complementary or at least partially complementary and thus creates the interlocking and/or friction connection to the first mating retainer and the second mating retainer.

A housing shell can be understood to be a bowl-shaped or an essentially bowl-shaped housing part. A housing shell can be designed as a housing cover that features a predominantly straight and/or flat center area and an edge area protruding at least partially from the center area in which the first or the second mating retainer can be formed. The shape and/or the size of the housing shells can differ from each other.

The connecting component can be part of the connection arrangement. The connector can be configured and designed to electrically connect the connecting cable to the connecting component. This means that connecting can be understood to create an electrical connection and/or a signal connection between the connector and the connecting component. The connecting component can be a functional component in the form of an electronic component in the housing or an intermediate contact component to conduct the current and/or the signals from the connector to at least one functional component, for example an electronic component, in the housing.

The connecting cable can feature several wiring harnesses that are combined in the connector. The connector is preferentially provided as a single-piece and/or as a single connector. The connecting cable can feature a wiring harness or several wiring harnesses that is/are fastened to the connector. The at least one wiring harness can feature a current and/or signal cable and an insulating jacket around the current and/or signal cable. Within the connector and/or on an outside connector, the at least one current and/or signal cable can be designed to be free, i.e. without insulating material in the form of a connection contact for establishing electrical contact to the connecting component.

According to a further embodiment of the present invention, it is possible in one connection arrangement for the retainer, the first mating retainer and/or the second mating retainer to feature one recess and at least one complementary protrusion for the interlocking and/or friction connection between the retainer, the first mating retainer and the second mating retainer. This means that the interlocking and/or friction connection between the retainer, the first mating retainer and the second mating retainer can be created in an especially simple, cost-effective and space-saving way. The recess can be understood to be an indentation, a groove and/or an undercut. The protrusion can be understood to be a nose-like or ribbed protrusion or a material section between two recesses. The retainer can feature at least one protrusion, whereas the first mating retainer and the second mating retainer can each feature at least one recess complementary to the protrusion. It is also possible for the retainer to feature at least one recess, whereas the first mating retainer and the second mating retainer can each feature at least one protrusion complementary to the recess. The at least one protrusion and the at least one recess are preferentially designed and arranged complementary to each other such that the at least one protrusion and the at least one recess are configured and designed for interlocking and/or friction retention of the connector on and/or in the housing. This means that an interlocking connection can be formed between the retainer and the first mating retainer. Likewise, an interlocking connection can be formed between the retainer and the second mating retainer.

Furthermore, it is possible with a connection arrangement according to the present invention for the connector to feature at least one connection contact for making electrical connect to the connecting component and the at least one connection contact to feature the at least one recess and/or the at least one protrusion for the interlocking and/or friction connection between the retainer, the first mating retainer and the second mating retainer. This means the electrical connection contact can fulfill a double function. In this way, the connection arrangement can be assembled especially compactly.

With an inventive connection arrangement, the connection contact or at least one part of the connection contact can be designed for interlocking and/or friction retention of the connector to the first housing shell and to the second housing shell, in particular to be T-shaped. Due to the T-shape, in particular a horizontal T-shape, the retainer can feature a first recess and a second recess, where the first recess can be designed to be complementary to a first protrusion of the first mating retainer and/or for retaining the first protrusion and the second recess to be complementary to a second protrusion of the second mating retainer and/or for retaining the second protrusion. The connection contact or the at least one part of the connection contact can be designed to be T-shaped or essentially T-shaped. T-shaped can be understood also to be a mushroom-head shape with two recesses or two undercuts.

Furthermore, with a connection arrangement according to the present invention the connector can feature at least one connection contact for establishing electrical contact to the connecting component and a retaining jacket that is designed to take the form of a jacket around at least one part of the connection contact, where the retainer is formed by the connection contact and/or the retaining jacket. This also serves to provide the connection arrangement as compactly as possible. Additional components for fastening the connecting cable to the housing are not required. The retaining jacket is, in an assembled state of the connection arrangement in which there is an interlocking and/or friction connection between the connector and the first housing shell and between the connector and the second housing shell, preferentially designed to be partially outside of the housing or outside of an internal volume of the outer wall of the housing. Furthermore, the retaining jacket can extend in the direction of the internal volume of the housing and be fastened to the connection contact, where the connection contact extends into the housing or into the internal volume within the housing free of the retaining jacket. If the retainer is formed by the retaining jacket and/or on the retaining jacket, forces can be reduced that can act on the connection contact through the application of force, for example when pulling on the connecting cable. To be more precise, in this case such forces no longer, or no longer exclusively, act on the connection contact.

According to a further design variant of the present invention, it is possible with a connection arrangement for the at least one recess and/or the at least one protrusion for the interlocking and/or friction connection to be formed between the retainer, the first mating retainer and the second mating retainer between the at least one connection contact and the retaining jacket. This makes it possible to create a space-saving and cost-effective means to retain the connector on the housing. For this purpose, the connection contact is preferentially fastened using an interlocking and/or friction connection to and/or partially in the retaining jacket. In particular, the retaining jacket can be formed as a die-cast or injection-molded component around a part of the connection contact and/or a part of the wiring harness of the connecting cable. Within the scope of the invention, the connection contact can be understood to be an end piece of the connecting cable from which a first part for the electrical contact and/or the signal transfer between the connecting cable and the connecting component, and a second part merges into a wiring harness of the connecting cable. The second part can be at least partially sheathed by the retaining jacket. Consequently, the connection contact can be a monolithic component of a current and/or signal cable of the connecting cable.

With an inventive connection arrangement, the first mating retainer and/or the second mating retainer can feature in each case several ribbed or nose-like protrusions. This makes it possible to implement the desired interlocking and/or friction connection in a simple, cost-effective and space-saving manner. Furthermore, it is possible for the at least one recess and/or the at least one protrusion to be formed in the shape of a ring around the retaining jacket. This also makes it possible to implement the desired interlocking and/or friction connection in a simple, cost-effective and space-saving manner. The ring-shaped protrusion can feature a first protrusion part for a retaining contact to the first mating retainer and a second protrusion at a distance to the first protrusion part for a retaining contact with the second mating retainer. The retaining contact can be understood to be the interlocking and/or friction connection between the retainer, the first mating retainer and the second mating retainer. The at least one recess and/or the at least one protrusion being formed in the shape of a ring around the retaining jacket can be understood by the at least one recess and/or the at least one protrusion are formed on an outer circumferential surface of the retaining jacket or in the form of running around the outer circumferential surface of the retaining jacket in the shape of ribs or grooves. The ring or the groove and/or the rub can extend continuously or with interruptions around the retaining jacket. The ring shape can feature straight and/or curved sections. The protrusion can nevertheless also be designed to be nose-shaped. The recesses can be correspondingly take the form of a blind hole.

According to a further embodiment of the present invention it is possible for the retaining jacket to consist of elastic plastic, for example rubber. In this way excessive tension forces in the connection arrangement can be prevented. Furthermore, this makes it possible to achieve an advantageous sealing effect for sealing the housing against environmental influences. A appropriate natural product can be used instead of the plastic. In addition, with an inventive connection arrangement, the retaining jacket can be designed as a single-piece and/or as a monolith. This makes it possible to make the connector available in an especially stable and cost-effective form.

Furthermore, with a connection arrangement according to the present invention, it is possible for the retaining jacket to feature a sealant for sealing a passage volume between the first housing shell and the second housing shell. The sealant can be designed to be an integral and/or monolithic component of the retaining jacket. The sealant can, in particular, take the form of a protrusion for example in the form of a sealing lip that extends in the form of a ring as part of the outer circumferential surface of the retaining jacket around the same. In a longitudinal direction, the sealant can be formed between two recesses of the retainer and/or at a protrusion of the retainer. The second can be configured and designed to prevent the flow of particles from one environment of the housing and/or the connection arrangement through a passage volume between the first housing shell and the second housing shell into the housing or a housing volume of the housing.

Furthermore, it is possible that with a connection arrangement according to the present invention at least one recess is formed between the at least one connection contact and the retaining jacket, at least one further recess is formed by the retaining jacket, the first mating retainer features several first protrusions and the second mating retainer features several second protrusions, where the protrusions are designed to be complementary to the recesses and, in an assembled state of the connection arrangement, the protrusions are positioned in the recesses or, as the case may be, in a corresponding space formed by the recesses. This makes it possible for the connecting cable or the connector to be fastened in an especially stable manner to the housing. At the same time, the load on the connection contact can be relieved with regard to forces acting on the connecting cable. According to a preferred embodiment, the first housing shell can feature at least two protrusions that engage in at least two recesses on the connector. To be more precise, at least one protrusion can engage in at least one recess between the connection contact and the retaining jacket and at least one further protrusion can engage in at least one further recess that is formed solely by the retaining jacket or in the retaining jacket. Likewise, the second housing shell can feature two protrusions that engage in two further recesses on the connector. Thus, at least one further or third protrusion engage in at least one further or third recess between the connection contact and the retaining jacket and at least one further or fourth protrusion can engage in at least one further or fourth recess that is formed solely by the retaining jacket or in the retaining jacket.

With a connection arrangement according to the present invention, it is additionally possible for the first housing shell including the first mating retainer and/or the second housing shell including the second mating retainer to be each designed as a single-piece and/or a monolith. This means that the housing can be made available in a simple, compact and cost-effective manner.

In addition, with an inventive connection arrangement, it is possible for the connecting component is designed to be at least partially fork-shaped for pressurized contacting of the at least one connection contact. This makes it possible to create the desired electrical connection and/or signal connection or, as the case may be, the corresponding connection quickly and in an uncomplicated manner. The connection contact or a part of the connection contact can be inserted easily and correspondingly with little wear into the fork-shaped connecting component or in a forked component of the connecting component. This means that the connecting component can feature several connecting elements that are each designed to be at least partially fork-shaped for pressurized contacting of the at least one connection contact. In this case, the connector can feature several connection contacts that each contact a fork-shaped connecting element in a pressurized manner, i.e. in an assembled state of the connection arrangement, are each arranged pressurized between two arms of the fork.

According to a further aspect of the present invention, a connecting cable is made available for a connection arrangement as described in detail above. The connecting cable features the connector for connecting the connecting cable to the connecting component in the housing, where the connector features the retainer for the interlocking and/or friction connection with the first mating retainer and the second mating retainer. The connecting cable can further also have the features described above in relation to the connection arrangement. Furthermore, the invention relates to a housing for a connection arrangement described above. The connection arrangement features the first housing shell and the second housing shell, where the first housing shell features the first mating retainer and the second housing shell features the second mating retainer for the interlocking and/or friction connection with the retainer. The housing can also have the features described above in relation to the connection arrangement. As the result, the inventive connecting cable and the inventive housing provide the same advantages as have been described in detail with regard to the inventive connection arrangement.

Further measures refining the invention arise from the description below of various sample embodiments of the invention, which are depicted schematically in the Figures. All of the features and/or advantages arising from the Claims, description or the figures, including design details and physical layouts, may be vital to the invention both by themselves and in various combinations.

BRIEF DESCRIPTION OF THE DRAWINGS

Reference is now made more particularly to the drawings, which illustrate the best presently known mode of carrying out the invention and wherein similar reference characters indicate the same parts throughout the views.

DETAILED DESCRIPTION OF THE DRAWINGS

Elements with the same function and modes of action are each provided with the same reference numbers in the Figures.

Figure 1:
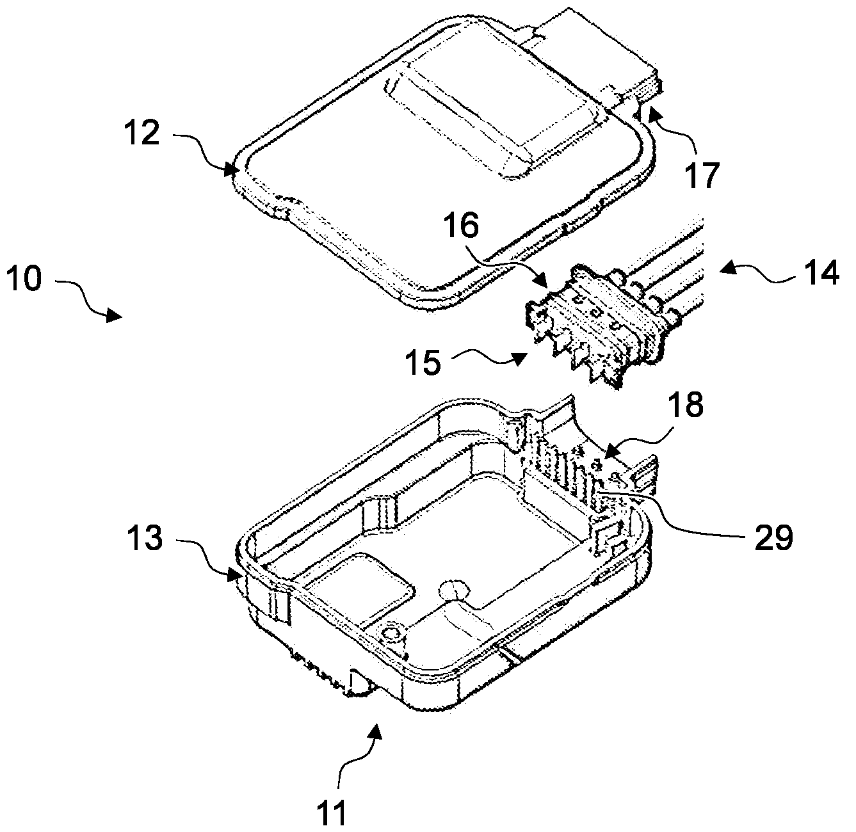
FIG. 1 is a perspective representation of a connection arrangement in a disassembled state of the connection arrangement according to a preferred embodiment.

FIG. 1 shows a connection arrangement 10 according to a preferred embodiment. The connection arrangement 10 depicted in FIG. 1 features a housing 11 for accommodating electronic components with a first housing shell 12 and a second housing shell 13. The connection arrangement furthermore features a connecting cable 14 with four wiring harness 31 and a connector 15 in the form of a "pigtail" connector for the electrical connection of the connecting cable 14 to a connecting component 29 in the housing 11. The first housing shell 12 features a first mating retainer 17, the second housing shell 13 features a second mating retainer 18 and the connector 15 features a retainer 16 for an interlocking and friction connection to the first mating retainer 17 and the second mating retainer 18 or for an interlocking and friction connection between the connector 15 and the housing 11.

Figure 2:
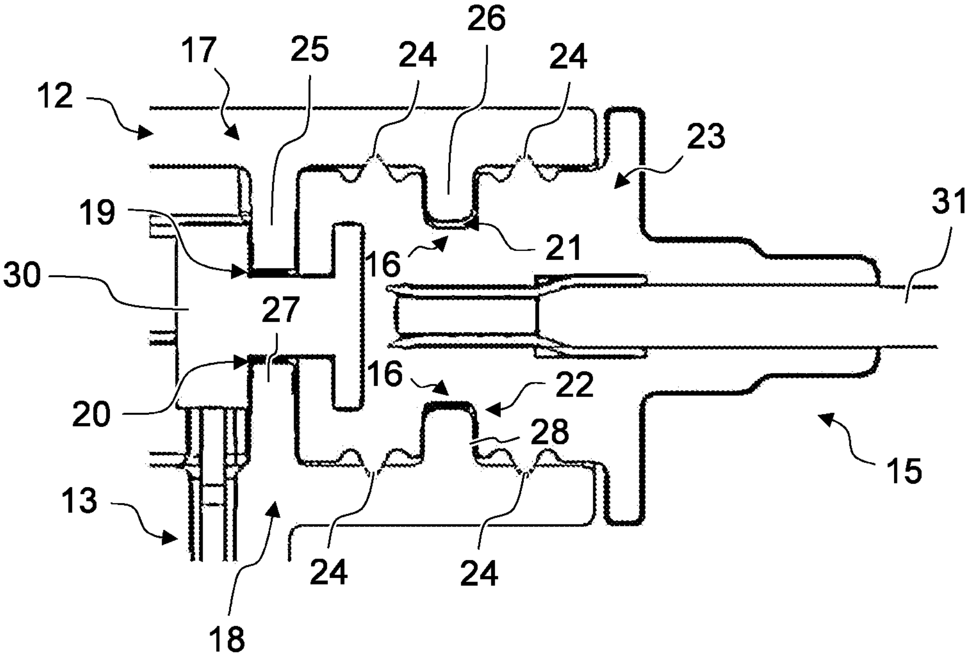
FIG. 2 is a cross-section side view of the connection arrangement depicted in FIG. 1 in an assembled state of the connection arrangement.

The interlocking and friction connection between the retainer 16, the first mating retainer 17 and the second mating retainer 18 are shown in detail in FIG. 2. As depicted in FIG. 2, the first housing shell 12 or the first mating retainer 17 features a ribbed protrusion 25 and nose-like protrusions 26. The second housing shell 13 or, as the case may be, the second mating retainer 18 features a ribbed protrusion 27 and nose-like protrusions 28. The connector 15 features four connection contact 30 (shown in particular in FIG. 3 and FIG. 4) for establishing electrical contact to the connecting component 29. The connector 15 further features a monolithic retaining jacket 23 made of elastic plastic that takes the form of a jacket around a part of the connection contacts 30 in each case. The retaining jacket 23 is injection molded onto a part of the connection contacts 30 in each case.

The connection contact 30 depicted in FIG. 2 takes the form of a T-shape in the end area of the connecting cable. The connection contact 30 thus forms two undercuts that, together with the retaining jacket 23, form a first recess 19 or a first gap and a second recess 20 or a second gap at each connection contact 30. In addition, several recesses in the form of a blind hole 21, 22 are formed in the retaining jacket 23. As depicted in FIG. 2, the protrusions 25, 26, 27, 28 are designed to be complementary to the recesses 19, 20, 21, 22. To be more precise, FIG. 2 depicts an assembled state of the connection arrangement 10, in which the ribbed protrusion 25 of the first housing shell 12 is positioned in the first recess 19 of the connector 15. The nose-like protrusions 26 of the first housing shell 12 are arranged in the recesses 21 that take the form of a blind hole on an upper side of the connector 15 or, as the case may be, the retaining jacket 23. The ribbed protrusion 27 of the second housing shell 13 is positioned in the second recess 20 of the connector 15. The nose-like protrusions 28 of the second housing shell 13 are arranged in the recesses 22 that take the form of blind holes on the lower side of the connector 15 or, as the case may be, the retaining jacket 23.

The retaining jacket 23 depicted in FIG. 2 additionally features a sealant 24 for sealing a passage volume between the first housing shell and the second housing shell. The sealant 24 features two sealing lips that extend in the form of a ring around the sealing jacket. In a longitudinal direction of the connecting cable 14, the two sealing lips are formed in front of and behind the recesses 21, 22 of the retaining jacket 23.

Figure 3:
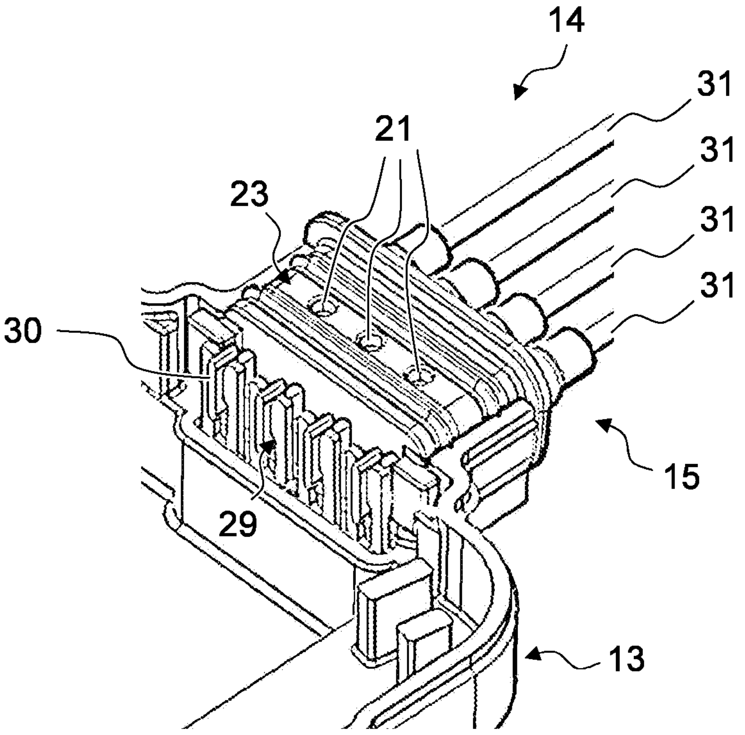
FIG. 3 is a perspective representation of a part of the connection arrangement shown in FIG. 1.
Figure 4:
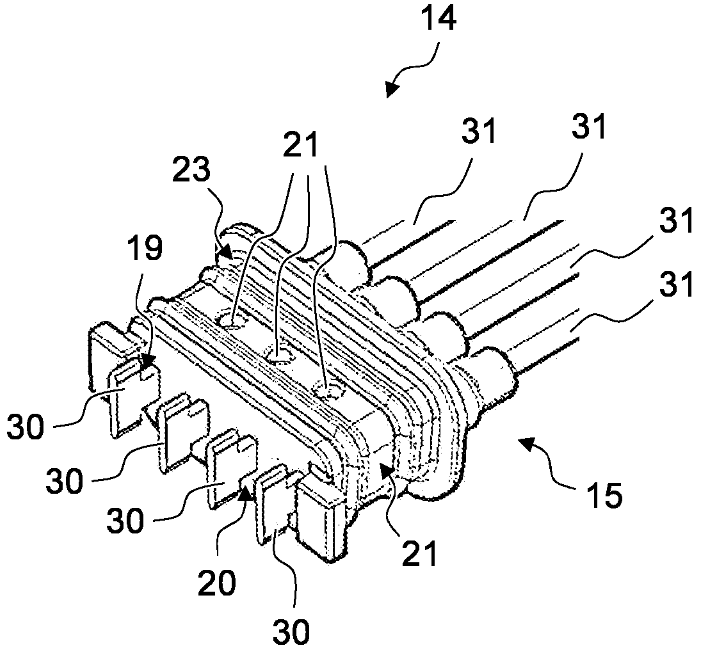
FIG. 4 is a perspective representation of a connecting cable of the connection arrangement shown in FIG. 1.
Figure 5:
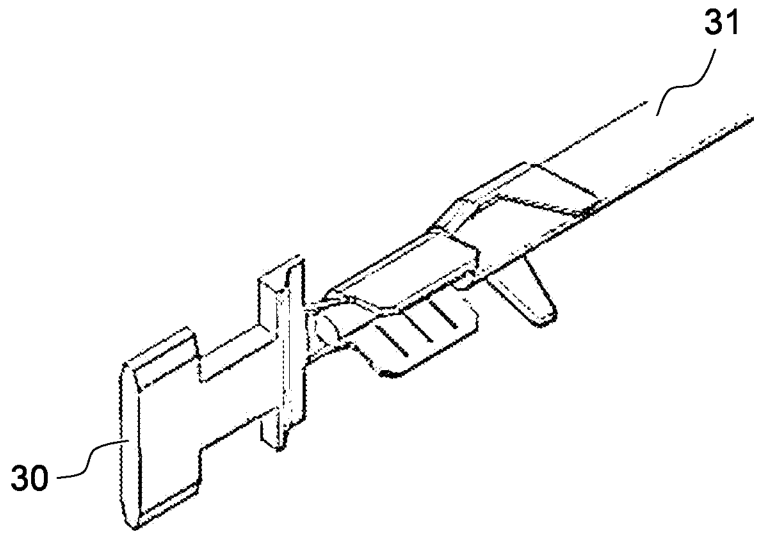
FIG. 5 is a perspective representation of a part of the connecting cable shown in FIG. 4.

FIG. 3 shows that the connecting component 29 is designed to be partially fork-shaped for making pressurized contact to the connection contacts (30). To be more precise, the connecting component 29 features four contact forks for establishing electrical contact of the four connecting components 30. FIG. 4 depicts a connecting cable 14 with a connector 15 disconnected from the housing 11. FIG. 5 shows a wiring harness 31 of the connecting cable 14 with a single connection contact 30 separated from the retaining jacket 23.

In addition to the embodiments depicted, the invention permits further design principles. This means that the invention should not be seen as being limited to the sample embodiment explained with reference to the figures. It is thus possible, for example, for the ribbed protrusions and corresponding, groove-like recesses described above to take the place of the nose-like protrusions 26, 27 and the associated recesses 21, 22 in the form of blind holes.

LIST OF REFERENCE NUMBERS

10 Connection arrangement
11 Housing
12 First housing shell
13 Second housing shell
14 Connecting cable
15 Connector
16 Retainer
17 First mating retainer
18 Second mating retainer
19 Recess
20 Recess
21 Recess
22 Recess
23 Retaining jacket
24 Sealant
25 Protrusion
26 Protrusion
27 Protrusion
28 Protrusion
29 Connecting component
30 Connection contact
31 Wiring harness

I claim:

1. A connection arrangement comprising:

a housing with a first housing shell and a second housing shell; and a connecting cable with a connector for connecting the connecting cable to a connecting component in the housing, wherein the first housing shell includes a first mating retainer, the second housing shell includes a second mating retainer, and the connector includes a retainer for an interlocking and/or friction connection with the first mating retainer and the second mating retainer, wherein the retainer, the first mating retainer and/or the second mating retainer include at least one recess and at least one complementary protrusion for the interlocking and/or friction connection between the retainer, the first mating retainer and the second mating retainer, and wherein the connector includes at least one connection contact for establishing electrical contact to the connecting component, and the at least one connection contact includes the at least one recess and/or the at least one protrusion for the interlocking and/or friction connection between the retainer, the first mating retainer and the second mating retainer.

2. The connection arrangement in accordance with claim 1, wherein at least a part of the at least one connection contact is T-shaped for interlocking and/or friction retention of the at least one connection contact on the first housing shell and on the second housing shell.

3. The connection arrangement in accordance with claim 1, wherein at least one of first mating retainer and the second mating retainer respectively include several rib-like protrusions.

4. The connection arrangement in accordance with claim 1, wherein at least one of the first housing shell and the second housing shell is respectively a single-piece and/or a monolith.

5. A connecting cable for a connection arrangement in accordance with claim 1, the connecting cable comprising:
the connector for connecting the connecting cable to the connecting component in the housing,
wherein the connector includes the retainer for the interlocking and/or friction connection to the first mating retainer and the second mating retainer, and
wherein the connector includes the at least one connection contact, the at least one connection contact including the at least one recess and/or the at least one protrusion for the interlocking and/or friction connection between the retainer, the first mating retainer and the second mating retainer.

6. A housing for a connection arrangement in accordance with claim 1, the housing comprising:
the first housing shell and the second housing shell, wherein the first housing shell includes the first mating retainer and the second housing shell includes the second mating retainer for the interlocking and/or friction connection to the at least one connection contact of the connector, the at least one connection contact including the at least one recess and/or the at least one protrusion.

7. A connection arrangement comprising:
a housing with a first housing shell and a second housing shell; and
a connecting cable with a connector for connecting the connecting cable to a connecting component in the housing,
wherein the first housing shell includes a first mating retainer, the second housing shell includes a second mating retainer, and the connector includes a retainer for an interlocking and/or friction connection with the first mating retainer and the second mating retainer,
wherein the connector includes at least one connection contact for establishing electrical contact between the connecting component and a retaining jacket formed as a jacket around at least one part of the at least one connection contact, wherein the retainer is formed by the at least one connection contact and/or the retaining jacket, and
wherein at least one recess and/or at least one protrusion allow the interlocking and/or friction connection between the retainer, the first mating retainer and the second mating retainer between the at least one connection contact and the retaining jacket.

8. The connection arrangement in accordance with claim 7, wherein the retaining jacket consists at least partially of elastic plastic.

9. The connection arrangement in accordance with claim 7, wherein the retaining jacket is a single-piece and/or a monolith.

10. The connection arrangement in accordance with claim 7, wherein the retaining jacket includes a sealant for sealing a passage volume between the first housing shell and the second housing shell.

11. A connecting cable for a connection arrangement in accordance with claim 7, the connecting cable comprising:
the connector for connecting the connecting cable to the connecting component in the housing,
wherein the connector includes the retainer for the interlocking and/or friction connection to the first mating retainer and the second mating retainer,
wherein the connector includes the at least one connection contact and the retaining jacket formed as a jacket around at least one part of the at least one connection contact,
wherein the retainer is formed by the at least one connection contact and/or the retaining jacket, and
wherein the at least one recess and/or the at least one protrusion allow the interlocking and/or friction connection between the retainer, the first mating retainer and the second mating retainer between the at least one connection contact and the retaining jacket.

12. A housing for a connection arrangement in accordance with claim 7, the housing comprising:
the first housing shell and the second housing shell,
wherein the first housing shell includes the first mating retainer and the second housing shell includes the second mating retainer for the interlocking and/or friction connection to the retainer formed by the at least one connection contact and/or the retaining jacket, and
wherein the at least one recess and/or the at least one protrusion allow the interlocking and/or friction connection between the retainer, the first mating retainer and the second mating retainer between the at least one connection contact and the retaining jacket.

13. A connection arrangement comprising:
a housing with a first housing shell and a second housing shell; and
a connecting cable with a connector for connecting the connecting cable to a connecting component in the housing,
wherein the first housing shell includes a first mating retainer, the second housing shell includes a second mating retainer, and the connector includes a retainer for an interlocking and/or friction connection with the first mating retainer and the second mating retainer,
wherein the connector includes at least one connection contact for establishing electrical contact between the connecting component and a retaining jacket formed as a jacket around at least one part of the at least one connection contact,
wherein at least one recess is formed between the at least one connection contact and the retaining jacket, at least one further recess is formed by the retaining jacket, the first mating retainer includes several first protrusions and the second mating retainer includes several second protrusions, and
wherein the protrusions are complementary to the recesses and the protrusions are positioned in the recesses in an assembled state of the connection arrangement.

14. A connecting cable for a connection arrangement in accordance with claim 13, the connecting cable comprising:
the connector for connecting the connecting cable to the connecting component in the housing,
wherein the connector includes the retainer for the interlocking and/or friction connection to the first mating retainer and the second mating retainer,
wherein the connector includes the at least one connection contact and the retaining jacket, wherein the at least one recess is formed between the at least one connection contact and the retaining jacket and the at least one further recess is formed by the retaining jacket, and wherein the recesses are complementary to the protrusions of the first and second mating retainers and the recesses receive the protrusions in an assembled state of the connection arrangement.

15. A housing for a connection arrangement in accordance with claim 13, the housing comprising:

the first housing shell and the second housing shell, wherein the first housing shell includes the first mating retainer and the second housing shell includes the second mating retainer for the interlocking and/or friction connection to the retainer, wherein the first mating retainer includes several first protrusions and the second mating retainer includes several second protrusions, wherein the protrusions are complementary to the recesses and the protrusions are positioned in the recesses in an assembled state of the connection arrangement.

16. A connection arrangement comprising:

a housing with a first housing shell and a second housing shell; and a connecting cable with a connector for connecting the connecting cable to a connecting component in the housing, wherein the first housing shell includes a first mating retainer, the second housing shell includes a second mating retainer, and the connector includes a retainer for an interlocking and/or friction connection with the first mating retainer and the second mating retainer, wherein the connector includes at least one connection contact for establishing electrical contact to the connecting component, wherein the connecting component is at least partially fork-shaped for pressurized contacting of the at least one connection contact.

17. A connecting cable for a connection arrangement in accordance with claim 16, the connecting cable comprising:

the connector for connecting the connecting cable to the connecting component in the housing, wherein the connector includes the retainer for the interlocking and/or friction connection to the first mating retainer and the second mating retainer, wherein the connector includes the at least one connection contact for establishing electrical contact to the connecting component, and wherein the at least one connection contact is configured for pressurized contacting of the at least partially fork-shaped connecting component in the housing.

18. A housing for a connection arrangement in accordance with claim 16, the housing comprising:

the first housing shell and the second housing shell, wherein the first housing shell includes the first mating retainer and the second housing shell includes the second mating retainer for the interlocking and/or friction connection to the retainer, and the connecting component in the housing, wherein the connecting component is at least partially fork-shaped for pressurized contacting of the at least one connection contact.

* * * * *